United States Patent Office 3,488,182

Patented Jan. 6, 1970

3,488,182

METHOD OF COMBATING WEEDS IN SUGARBEET CULTURES

Ludwig Ebner, Stein, Aargan, Switzerland, assignor to Ciba Limited, Basel, Switzerland, a Swiss company

No Drawing. Filed June 11, 1968, Ser. No. 735,975
Claims priority, application Switzerland, June 16, 1967, 8,582/67
Int. Cl. A01n *9/20*
U.S. Cl. 71—120 1 Claim

ABSTRACT OF THE DISCLOSURE

A method of combating weeds in sugarbeet cultures is disclosed. The active component is N-4-trifluoromethylphenyl-N',N'-dimethylurea.

The present invention relates to herbicides containing N-trifluoromethylphenyl-N',N'-dimethylureas.

Herbicides containing, as active ingredient, N-3-trifluoromethylphenyl - N',N' - dimethylurea (A) and N-4-trifluoromethylphenyl - N',N' - dimethylurea (B) are known (cf. British specification 914,779). In that specification, it is shown that these herbicides have a certain selectivity toward *Zea mays.*

The present invention is based on the surprising observation that N-4-trifluoromethylphenyl - N',N' - dimethylurea is excellent for controlling weeds in sugarbeet cultures.

Accordingly, the present invention provides a herbicide for combating weeds in sugarbeet cultures, which comprises the compound of the formula

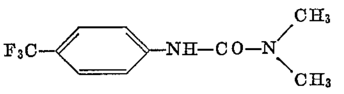

(B)

together with a suitable carrier.

In a field test the compounds (A) and (B) were compared to establish their selectivity in sugarbeet cultures. Surprisingly, it was found that compound (B) acts well against weeds without damaging the sugarbeets, whereas compound (A) damages the sugarbeets very extensively. This result is certainly unexpected because in other tests it was found that compound (B) is rather a more potent herbicide.

Compounds (A) and (B) were formulated in the manner disclosed in British specification 914,779.

The present invention also provides a method for combating weeds in sugarbeet cultures, which comprises applying to the cultures a preparation as described above.

The following examples illustrate the invention:

EXAMPLE 1

A field was seeded with sugarbeets and treated 1 day after seeding with the following compounds in the indicated amounts: (A) (B) 0.5, 0.75, 1.0 and 1.5 kg. of active substance per hectare in each case.

The evaluation made 3 weeks after application revealed the following results:

| | Kg. of active substance per hectare | | | | | | | |
|---|---|---|---|---|---|---|---|---|
| | Compound (A) | | | | Compound (B) | | | |
| Culture | 0.5 | 0.75 | 1.0 | 1.5 | 0.5 | 0.75 | 1.0 | 1.5 |
| Sugarbeets | 4 | 4 | 3 | 2 | 9 | 9 | 8 | 7 |
| *Urtica urens* | 2 | 2 | 1 | 1 | 2 | 2 | 1 | 1 |
| *Galinsoga parv* | 2 | 1 | 1 | 1 | 2 | 1 | 1 | 1 |
| *Setaria virid* | 3 | 2 | 1 | 1 | 3 | 3 | 2 | 1 |
| *Portulaca ol* | 2 | 1 | 1 | 1 | 1 | 1 | 1 | 1 |
| *Stellaria med* | 1 | 1 | 1 | 1 | 1 | 1 | 1 | 1 |

1=free from weeds (100% effect) or total destruction.
2=good effect or strong damage.
3=good to satisfactory effect or very strong damage.
9=no damage.

EXAMPLE 2 (TEST FOR HERBICAL EFFECT)

The strong effect of (B) in comparison with (A) is demonstrated by the results of the total herbical tests shown in the following table. Amount of active substance used: 5.0 kg. per hectare.

| | Compound (B) | Compound (A) |
|---|---|---|
| Grass vegetation | 1 | 2 |
| *Ajuga reptans* | 1 | 5 |
| *Salvia pratensis* | 1 | 4 |
| *Plantago maior* | 1 | 3 |

1=complete destruction of weed.
2=good effect—some weakened plants.
3=satisfactory—several surviving plants.
5=unsatisfactory effect.
9=as untreated control.

It is seen that the total herbicidal effect of 5.0 kg. of compound (B) per hectare is stronger than that of compound (A).

The good selectivity of (B) towards sugarbeets for a comparable weed controlling effect is all the more surprising.

I claim:

1. A method of preemergently controlling weeds in sugarbeet cultures, which comprises using as active component an effective amount of the compound of the formula

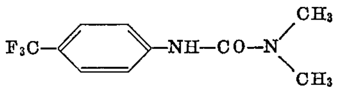

References Cited

UNITED STATES PATENTS 3,134,665 5/1964 Martin et al. ________ 71—106
3,205,258 9/1965 Simonian et al. ______ 71—120

OTHER REFERENCES

Hansch et al.: "The Structure Activity Relationship in Oruides Inhibiting Photosynthesis" (1966), Biochimica et Biophysica Act A 112, pp. 381–391 (1966).

Anderson et al.: "Inhibition of Plant Growth by Some Nitrophenylureas," Weeds, vol. 5 (1957), pp. 135–137.

Counselman et al.: "Herbicidel Activity etc." (1964), Proc. NEWC Conf. January 1964, pp. 349–353, 356 and 357.

LEWIS GOTTS, Primary Examiner

G. HOLLRAH, Assistant Examiner